Oct. 6, 1931.  F. SCHULDER  1,825,825
COUPLING CONNECTION
Filed March 16, 1927   2 Sheets-Sheet 1
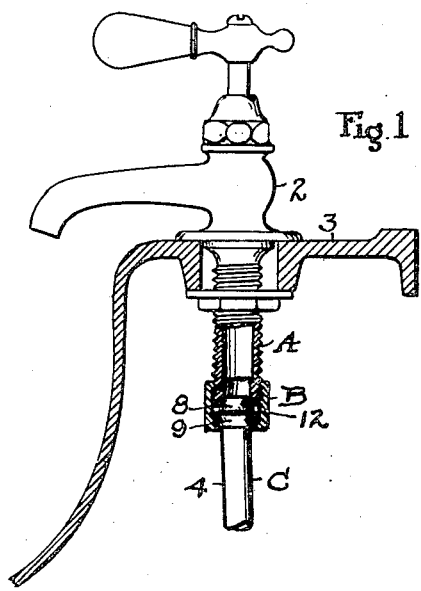
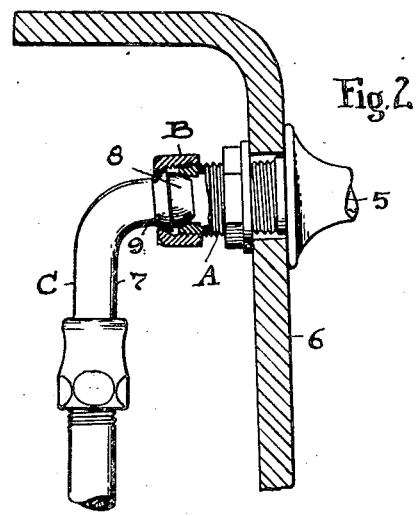
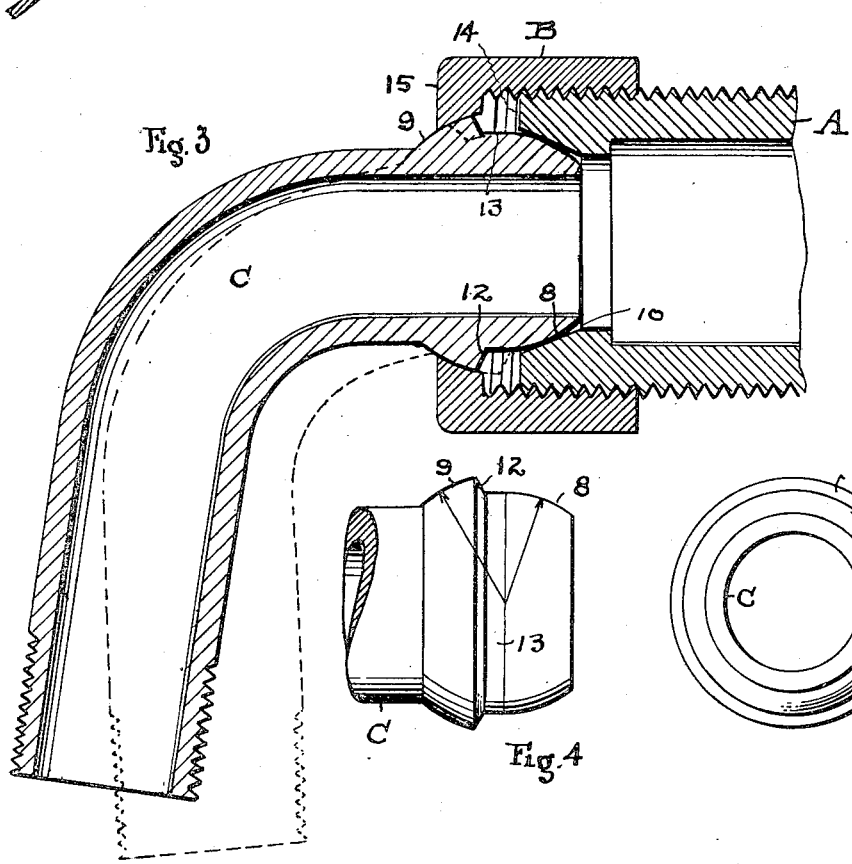
Inventor
FRED SCHULDER
By
Attorney Oct. 6, 1931.   F. SCHULDER   1,825,825
COUPLING CONNECTION
Filed March 16, 1927   2 Sheets-Sheet 2

Inventor
FRED SCHULDER
By
Fisher, Moser & ......
Attorney

Patented Oct. 6, 1931

1,825,825

UNITED STATES PATENT OFFICE

FRED SCHULDER, OF CLEVELAND, OHIO

COUPLING CONNECTION

Application filed March 16, 1927. Serial No. 175,708.

My invention pertains to an improvement in coupling connections, and more particularly in ball coupling connections either for pipes, bath cock and basin cock shanks, or other articles. In general my object is to provide a member having a ball coupling of differential diameter; whereby a double ball joint or swiveled connection may be made and a fluid-tight joint obtained between two members; whereby the ball portion on the male member may be caused to contact and seat within the female member a substantial distance inwardly from the outer edge of the socket where the wall is of greater thickness and more resistant to coupling strains; whereby the cylindrical body of the male member may be made of relatively large diameter and a bore or passage of comparatively large size may be used therein without inherent weakness at the coupling joint, and whereby a spherical bearing surface may be obtained for the coupling nut which is larger than the spherical bearing surface which projects into the flaring seat of the female member. The present invention is also applicable to and of utility in two coupling members wherein it is found desirable to have a ball joint with a limited rocking movement between them, and in a ball joint where the rocking movement may be limited in one plane and substantially prevented in any other plane, all as herein shown and described and more particularly pointed out in the claims.

Figure 6:
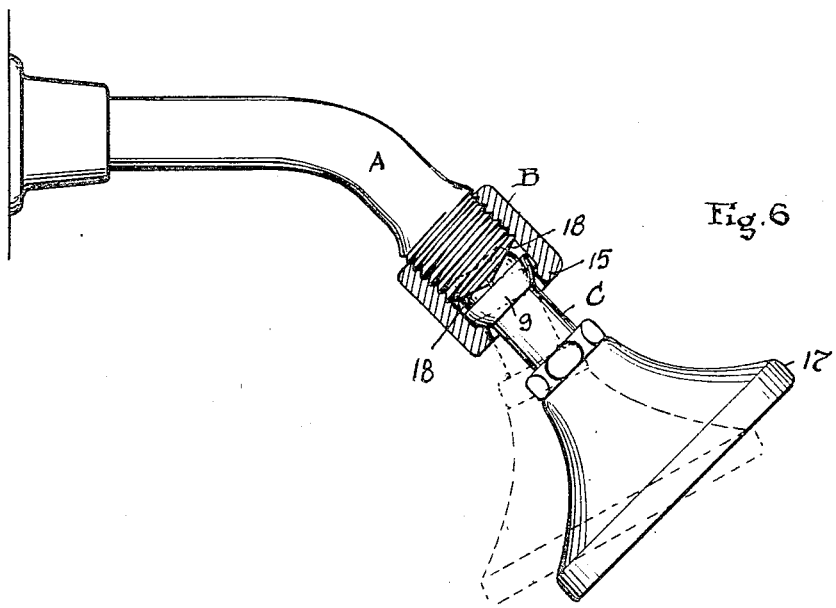
Figure 7:
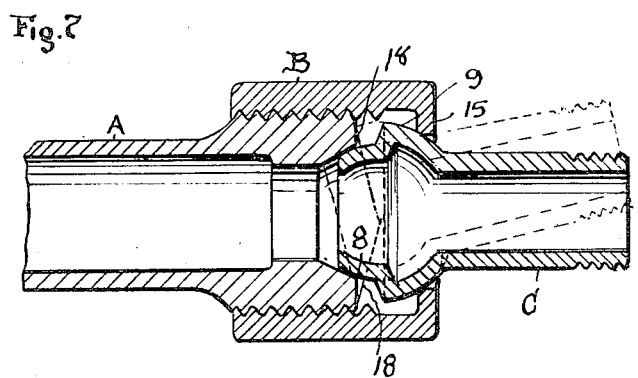
Figure 8:
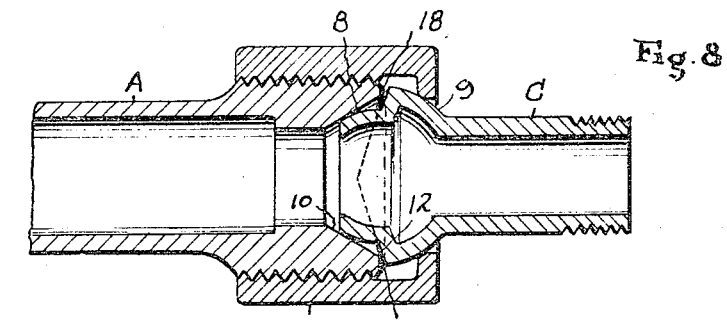
Figure 9:
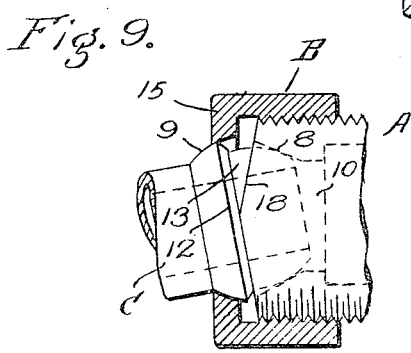

In the accompanying drawings, Fig. 1 is a side elevation and sectional view of a faucet and basin, and Fig. 2 a similar view of a bath cock and tub, comprising coupling members embodying the invention. Fig. 3 is an enlarged sectional view of a pair of tubular coupling members constructed according to my invention and united together by a coupling nut. Fig. 4 is a side elevation of the double ball coupling head, and Fig. 5 is an end view thereof. Fig. 6 is a side elevation of a coupling for a shower head, and Figs. 7 and 8, are sectional views, enlarged, of the coupling joint shown in Fig. 6. Fig. 9 is a sectional view and elevation of the male member and coupling nut of Fig. 3 shown attached to a female member of the kind shown in Figs. 6 to 8.

The invention is of particular utility in connecting faucets, bath cocks, shower heads, and other water distributing appliances, and fittings, to supply pipes, but it is not necessarily limited to such specific uses inasmuch as the coupling joint per se may be embodied and used with advantage in other classes and kinds of devices requiring an articulated connection. But as shown in Fig. 1, a faucet 2 mounted upon a basin 3 comprises a straight detachable tail piece 4 constructed according to my invention, and Fig. 2 discloses a bath cock shank 5 mounted upon the inclined wall of a bath tub 6 and connected to a tubular elbow 7 embodying the invention. The joint in each case is constructed as delineated in Fig. 3. Thus the female member A comprises a straight tubular extremity which is formed with external screw-threads to permit a coupling nut B to be connected therewith, and the male member C comprises a bulbous extremity which comprises two spherical surfaces or zones 8 and 9, respectively, of different radii or diameters having the same center, see Fig. 4. The spherical surface 8 of smallest diameter is formed at the extreme end of member C to permit this part to be projected a substantial distance into the flaring mouth 10 of member A and to engage the internal conical surface thereof where the wall is of substantial thickness and strength. Moreover an increased adjustment of member C is obtained when a deep seating thereof is established within female member A. The degree of arc movement of spherical part 8 within the flaring seat 10 is also of substantial extent when the larger spherical surface 9 is separated a substantial distance apart from the outer end of female member A as defined by an annular shoulder 12. Spherical part 8 is thus elongated or projected forwardly by forming the sloping or inclined shoulder 12 in a plane outwardly beyond the plane which passes through the common center of spherical bands or zones 8 and 9 respectively. The middle or intervening zone 13 may be a short straight cylindrical surface, or it may be a curved continuation of the spherical surface 8. When the tubular members are connected together, shoulder 12 forms a stop adapted to engage the end edge 14 of female member A, thus limiting the rocking or tilting movement of male member C in respect thereto; and the large spherical surface 9 provides a round shoulder of substantial area and thickness adapted to be engaged by the inwardly-extending flange 15 of coupling nut B in any tilted position of member C. The engaging edge or surface of flange 15 on coupling nut B may be partly spherical to correspond with the spherical surface 9, but a complementary spherical surface is not absolutely essential in the coupling nut to effect tight clamping of male member C within female member A. Accordingly, member C with its differential double ball formation may be used with advantage with faucet or bath cock shanks, and coupling nuts, of standard construction such as now made and used by the trade. The two spherical portions of unequal size on the male member may be said to be concentric, being developed on concentric circular lines from the same point or center, and because the smaller spherical surface is in advance of the larger one a swiveled connection can be made with absolutely fluid-tight sealing contact well within the female member where the wall is relatively thick and strong, and without compulsory use of a small bore or constricting passage in the male member. Member C may be either cast and machined or pressed into the desired form or shape, and to facilitate pressing, punching or drawing operations the surface 13 at the base of annular shoulder 12 is preferably straight and cylindrical for a short distance between said shoulder and the smaller spherical part 8. A short straight cylindrical middle surface or zone 13 will not limit the tilting movement of coupling member C, especially when the female member comprises a straight flaring surface or seat therein. In using a deep spherical seat within the end of the female coupling member, spherical surface 8 on the male member may begin at the immediate base of shoulder 12.

The annular shoulder 12 may also be used to advantage in a coupling member for a fitting or fixture such as a shower head 17, see Figs. 6, 7, and 8. Thus in some fixtures, it is desirable to rock or tilt the fixture in only one plane, and with very short stop limits or no movement in another plane say at right angles thereto. For example, in a shower head it is often desirable to tilt the head vertically but not laterally or horizontally, otherwise the spray would be discharged beyond the sides of a bath tub. To prevent lateral movement of the male coupling member C, the outer recessed end of female member A may be beveled reversely to provide reversely-inclined faces 18—18 which will permit annular shoulder 12 on the ball member to have a limited play or movement in respect thereto in one plane, say vertically. However the apex portions of the reversely-inclined faces extend far enough forward so that they nearly impinge or bear against the sloping face of shoulder 12 at all times, say as shown in Fig. 8, thereby preventing member C from rocking or tilting in any other plane than a vertical plane. Otherwise the coupling members are constructed in the same way as hereinbefore described.

What I claim, is:

1. A tubular member having a spherical enlargement of differential diameter embodying an annular shoulder, a second tubular member adapted to seat the smaller portion of said spherical enlargement having a V-shaped end face adapted to prevent the movement of said first member in one plane more than in another plane, and coupling means for said members.

2. A tubular member having an end formed with reversely-inclined faces, a second tubular member having concentric spherical enlargements of differential diameter separated by a cylindrical zone substantially narrower than the spherical zone of smallest diameter and formed with an annular shoulder between said cylindrical zone and one of said spherical zones and adapted to bear against the apex of said inclines, said second member being adapted to swing in opposite directions in one plane within the limits fixed by said annular shoulder and said faces of said tubular member, and a clamping nut for said members.

In testimony whereof I affix my signature.

FRED SCHULDER.